W. R. HALL.
BOOK AND BUNDLE RACK FOR BICYCLES.
APPLICATION FILED NOV. 15, 1911.
1,040,192.
Patented Oct. 1, 1912.
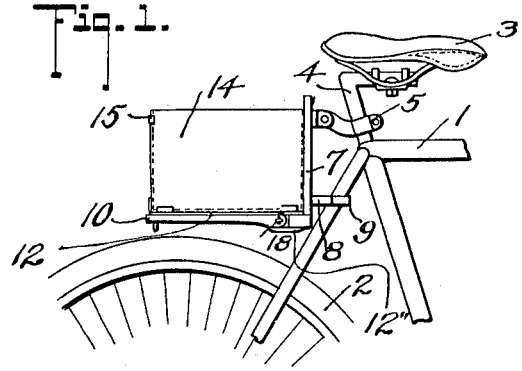
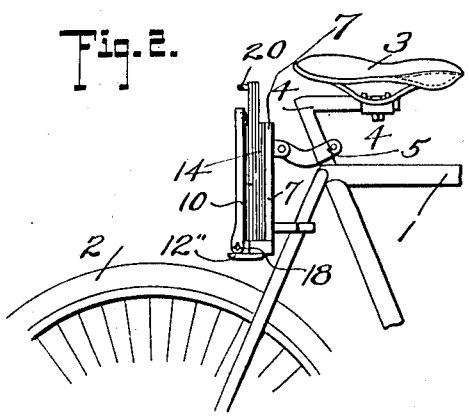
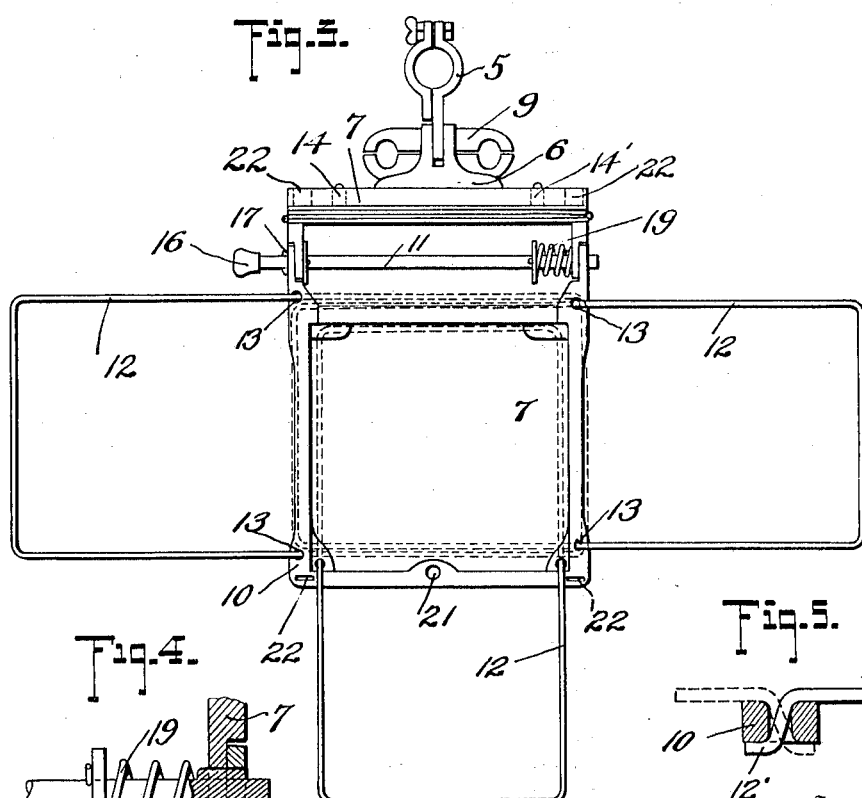
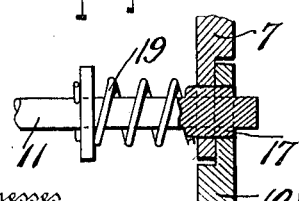
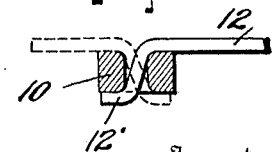
Inventor
William R. Hall

UNITED STATES PATENT OFFICE.

WILLIAM R. HALL, OF WARNER, NEW HAMPSHIRE.

BOOK AND BUNDLE RACK FOR BICYCLES.

1,040,192. Specification of Letters Patent. Patented Oct. 1, 1912.

Application filed November 15, 1911. Serial No. 660,473.

*To all whom it may concern:*

Be it known that I, WILLIAM R. HALL, a citizen of the United States, residing at Warner, in the county of Merrimack and State of New Hampshire, have invented certain new and useful Improvements in Book and Bundle Racks for Bicycles, of which the following is a specification.

This invention pertains to that class of luggage carriers which may be readily attached to the frame of a bicycle preferably at its rear portion beneath the seat.

The object of the invention is to provide a simple and efficient carrier for either large or small bundles or packages, such as suit cases, books, or the like, and one adapted to be folded into small compass when not in use.

A further object is to provide an independent structure for carrying large packages or suit cases, the carrier for books or small bundles being held in inoperative position and vice versa.

With the above and other objects in view, this invention consists of the construction, combination, and arrangement of parts, all as hereinafter more fully described, claimed and illustrated in the accompanying drawings, wherein:—

Figure 1 is a side elevation showing a partial view of a bicycle frame with my invention attached thereto, the receptacle for small packages being in operative position; Fig. 2 is a side elevation showing the carrier in folded position and attached to the frame of the bicycle; Fig. 3 is a top plan view of the carrier with the extension frames in operative position and the receptacle for carrying small packages in folded or inoperative position; Fig. 4 is a detail view showing the locking means for holding the supporting frame in extended and folded positions; Fig. 5 is a detail view showing the end of one of the extension frames in operative and inoperative positions. Fig. 6 is an enlarged detail view, showing more clearly the locking means for the carrier frame.

Throughout the following detail description, and on the several figures of the drawings, similar parts are referred to by like reference characters.

Referring now to the drawings, 1 indicates the frame of a bicycle, 2 the rear wheel, and 3 the seat. The luggage carrier comprising my invention is adapted to be secured to the seat post 4 by means of the clamping member 5, said member being pivoted in an arm 6 extending from the upper portion of the main vertical supporting frame 7, which is in turn supported at its lower portion by means of the bracket arm 8. The arm 8 is provided at its outer extremity with a clamping member 9 suitably securing the same to the rear fork of the bicycle frame.

The lower portion of the supporting frame 7 has extending horizontally therefrom a pivoted frame 10, said frame being pivotally mounted upon the locking rod 11. The frame 10 constitutes the supporting means for the auxiliary extension frames 12 preferably made of stiff wire, one being provided for each of the three sides of said frame, as clearly shown in Fig. 3 of the drawing. As is shown in Fig. 5, the inner ends of each of the extension frames 12 are bent downwardly and outwardly to form short extensions 12', and said ends are inserted in openings 13 in the frame 10, the extensions 12' adequately supporting the weight placed upon them and said frame 10 in coöperation with the horizontally extending arms 12" suitably secured to the lower portion of the vertical frame 7. The carrier as thus described will readily carry large bundles and suit cases or the like.

For the accommodation of small bundles or packages, I provide a collapsible receptacle 14 having extensions 14' formed on the upper portion of the inner side thereof which are adapted to be inserted into openings in the upper transverse bar or member of the main supporting frame 7. The sides of the receptacle 14 are hinged at their lower edges to the bottom thereof and at their upper portions are provided with fastening means, indicated at 15, securely holding the same in extended operative position. As thus described, the receptacle 14 may be used alone, in which case the extension frames 12 are removed from their extended positions and again inserted in the opposite direction in the openings 13 so as to occupy the dotted line positions shown in Fig. 3 and in the detail view of Fig. 5. Should it be desired, however, to use the carrier for large packages, the receptacle 14 is collapsed and folded into upright position against the frame 7 and the extension frames 12 placed in their extended operative positions.

When not in use, the luggage carrier may be folded up entirely as will be apparent from the foregoing description, against the rear portion of the frame 7, and as shown in Fig. 2, and I provide means for locking the carrier in this position, as will be hereinafter described.

The locking rod 11 is provided at one end with a knob or handle 16 and adapted to coöperate with the bottom portion of the frame 7 at either side therof are provided locking lugs 17 engaging in the double key hole slots 18 in said frame. It will thus be seen that the frame 10 may be held in horizontal position by engaging the lugs 17 in the longitudinal portion of the slots 18, and when the carrier is not in use and in the folded position shown in Fig. 2, the rod 11 is pressed inwardly to disengage the lugs and permit the engagement thereof with the vertical portion of said slots 18. To facilitate the operative engagement thus described, I provide a coiled spring 19 at one end of the rod 11, the tension of which spring will tend to maintain the lugs 17 in the slots 18.

The receptacle 14 has formed on the outer extremity of its bottom an apertured lug 20 which is received in the opening 21 in the outer transverse member of the frame 10 passing therethrough, when said receptacle is in operative position. A key may then be inserted in the aperture in the lug 20 and thus hold the receptacle against undue vibration. In order to hold the larger packages in position on the carrier, suitable straps or other like fastening means may be passed through the slots 22 in the outer transverse member of the frame 10 and the upper transverse member of the frame 7.

The operation and advantages of my invention will be apparent from the foregoing description, but I do not wish to be confined to the exact proportions and arrangement of parts shown in the drawings, since they may be varied by those skilled in the art to which they refer without departing from the spirit of my invention, as clearly set forth in the claims hereto appended.

Having thus fully described the invention, what is claimed as new is:—

1. In a luggage carrier, the combination with a vehicle, of means for attaching said carrier to the same, the carrier comprising a main supporting frame therefor, a foldable receptacle carried thereby, an auxiliary supporting frame mounted on the main frame aforesaid, and means coöperating with the auxiliary frame to lock and hold the receptacle in operative and inoperative position.

2. In a luggage carrier, the combination with a vehicle, of means for attaching said carrier to the same, the carrier comprising a main supporting frame therefor, a collapsible receptacle removably carried thereby, an auxiliary supporting frame pivotally mounted on the main supporting frame, and means on the pivot for the auxiliary frame to lock the latter in extended position when the receptacle is in open operative position and adapted to hold the same in vertical position to hold said receptacle in a closed inoperative position.

3. In a luggage carrier, the combination with a vehicle, of means for attaching said carrier to the same, the carrier comprising a main supporting frame therefor, a collapsible receptacle removably carried thereby, a locking rod having its bearings in the main frame, an auxiliary supporting frame pivotally mounted on the locking rod, said main and auxiliary supporting frames having corresponding slots therein adjacent the locking rod, and lugs projecting from the said rod to engage in the slots aforesaid to hold the auxiliary frame in extended position when the receptacle is in open operative position and adapted to lock the auxiliary frame in vertical position when the receptacle is in closed inoperative position.

4. In a luggage carrier, the combination with a vehicle, of means for attaching said carrier to the same, the carrier comprising a main supporting frame, a receptacle comprising a collapsible structure and adapted to be folded up against the main frame when in inoperative position, an auxiliary supporting frame mounted on the main frame, other auxiliary extension frames removably mounted on the auxiliary supporting frame aforesaid and adapted to be held in extended operative position when the receptacle is folded in inoperative position, and means for locking the auxiliary supporting frame in extended operative position.

5. In a luggage carrier, the combination with a vehicle, of means for attaching said carrier to the same, the carrier comprising a main supporting frame therefor, a receptacle comprising a collapsible structure carried by the main supporting frame, an auxiliary supporting frame mounted on the main frame, reversible extension frames mounted on the auxiliary supporting frame aforesaid and adapted to be held in folded position when the receptacle aforesaid is in open operative position, and means for locking the auxiliary supporting frame in extended operative position when the receptacle is extended and adapted to lock the receptacle and auxiliary extension frames aforesaid in closed inoperative positions.

6. In a luggage carrier, the combination with a vehicle, of means for attaching said carrier to the same, the carrier comprising a main supporting frame therefor, a collapsible receptacle removably carried thereby, a locking rod having its bearings in the main frame, an auxiliary supporting frame pivotally mounted on the locking rod, said main and auxiliary supporting frames having corresponding slots therein adjacent the locking rod, lugs projecting from the said rod to engage in the slots aforesaid to hold the auxiliary frame in extended position when the receptacle is in open operative position and adapted to lock the auxiliary frame in vertical position when the receptacle is in closed inoperative position, a spring mounted on the locking rod aforesaid and adapted to hold the lugs in engagement with said slots, and means formed on the receptacle to engage with the auxiliary supporting frame to prevent undue vibration of said receptacle when the latter is in operative position.

In testimony whereof I affix my signature in presence of two witnesses.

WILLIAM R. HALL.

Witnesses:
A. J. HOOK,
M. E. BARTLETT.

Copies of this patent may be obtained for five cents each, by addressing the "Commissioner of Patents, Washington, D. C."